(12) United States Patent
Wigley et al.

(10) Patent No.: US 6,611,371 B2
(45) Date of Patent: Aug. 26, 2003

(54) SINGLE PARAMETER GAIN SLOPE ADJUSTER FOR AN OPTICAL SYSTEM

(75) Inventors: Peter G. Wigley, Corning, NY (US); Kai Wundke, Horseheads, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/809,882

(22) Filed: Mar. 16, 2001

(65) Prior Publication Data

US 2003/0086152 A1 May 8, 2003

(51) Int. Cl.[7] .............................................. H04B 10/12
(52) U.S. Cl. ............................... 359/337.2; 359/337.1; 359/337.21; 359/337.22; 359/337.4
(58) Field of Search ........................ 359/337.2, 337.21, 359/337.22, 337.4, 510, 337.1, 337

(56) References Cited

U.S. PATENT DOCUMENTS

| | | | |
|---|---|---|---|
| 5,764,406 A | * 6/1998 | Newhouse et al. | 359/161 |
| 6,061,171 A | * 5/2000 | Taylor et al. | 359/337 |
| 6,268,954 B1 | 7/2001 | Cheng | |
| 6,307,691 B1 | * 10/2001 | Goossen | 359/124 |
| 6,321,010 B1 | * 11/2001 | Walker et al. | 250/227.19 |
| 6,359,726 B1 | * 3/2002 | Onaka et al. | 359/337.1 |

FOREIGN PATENT DOCUMENTS

| | | | |
|---|---|---|---|
| EP | 1052 745 A2 | 11/2000 | H01S/3/067 |
| EP | 1072 937 A1 | 1/2001 | G02F/1/225 |

OTHER PUBLICATIONS

Goossen et al. LEOS '99, Nov. 8–11, 1999, vol. 2.*
Uetska et al. Electronics Letts. Feb. 15, 1990 vol. 26 No. 4.*
Zappe et al. IEE/LEOS 1996, Aug. 5–9, 1996.*
Bray et al. ECOC '98, Sep. 20–24, 1998.*
Goossen et al. IEEE Phot. Tech. Letts. vol. 6 No. 9 Sep. 1994.*
Goossen et al. IEEE Phot. Tech. Letts. vol. 12 No. 7 Jul. 2000.*
Goossen IEEE/LEOS 2000 Aug. 21–24, 2000.*
Kashyap et al. IEEE Phot. Tech. Letts. vol. 5 No. 2 Feb. 1993.*
Ford et al. Journal of Lightwave Tech. vol. 16, No. 9 Sep. 1998.*
Llang et al. OFC '98 Feb. 22–27, 1998.*
Clapp et al. ECOC '98 Sep. 20–24, 1998.*
Yamada et al. Electronics Letts. Feb. 19, 1998 vol. 34 No. 4.*
Lee et al. IEEE Phot. Tech. Letts. vol. 8, No. 12, Dec. 1996.*
Compensation of L–band Gain–Wavelength Characterustics Using Linear and Second–order Variable Gain Equalizers; T. Naito et al; ©1999.
Ultra–Wide Dynamic Range Erbium Doped Fiber Amplifiers Employing Variable Attention Slope Compensator; Kakui et al; pp. 167–169, 1999.
Inoue et al. "Tunable Gain Equalization Using a Mach–Zehnder Optical Filter in Multistage Fiber Amplifiers", IEEE Photonics Technology Letters, vol. 3, No. 8, Aug. 1991.

* cited by examiner

Primary Examiner—Thomas G. Black
Assistant Examiner—Stephen Cunningham
(74) Attorney, Agent, or Firm—Terry S. Callaghan; Svetlana Z. Short (57) ABSTRACT

An optical device including an optical amplifier to amplify optical signals received through an optical input, and to supply the amplified optical signals from an optical output, and an optical filter coupled to the optical amplifier. The optical filter changes the gain slope of the optical amplifier in response to a change in a single parameter of the optical filter. The single parameter may be a change in a central wavelength of the optical filter function. The optical filter preferably has a parabolic spectral function. The single parameter may be varied as a function of temperature such that the variable optical attenuator compensates for variations in the gain spectrum of the optical amplifier that occur as a function of operating temperature.

39 Claims, 9 Drawing Sheets

SINGLE PARAMETER GAIN SLOPE ADJUSTER FOR AN OPTICAL SYSTEM

BACKGROUND OF THE INVENTION

1. Field of the Invention

The present invention generally relates to an optical transmission system and, more particularly, relates to optical filters for accomplishing a change of the gain characteristics of an optical amplifier over an operating wavelength band.

2. Technical Background

In an optical network, optical signals are typically transmitted through a fiber over relatively long distances. Because the strength of the optical signals tends to decrease with increasing transmission path length, it has become commonplace to divide the fibers into spans, with in-line optical amplifiers positioned between the spans. The typical span is, for example, 80–120 km in length. While the in-line optical amplifiers boost the signal strength of the transmitted optical signals, such optical amplifiers typically do not exhibit flat gain characteristics over the band of wavelengths of the optical signals that are transmitted through the optical amplifier. Thus, in an optical network, if each of the optical amplifiers positioned between each fiber span amplify optical signals having certain wavelengths more than they amplify optical signals having other wavelengths, some optical signals will not be amplified sufficiently over a long transmission path and those signals will be more susceptible to errors.

To provide for uniformity of signal amplification at each span of all optical signals transmitted through the network, various techniques have been proposed to flatten the gain of the optical amplifiers so that all the optical signals are amplified the same amount by each optical amplifier provided along a given transmission path. One technique that has been proposed is to provide a gain-flattening dielectric optical filter that has an insertion loss spectrum (also referred to as the "transmission spectrum") that is inversely related to the gain spectrum of the optical amplifier. In other words, the gain-flattening filter will attenuate those wavelengths that are more greatly amplified by the optical amplifier such that the output of the gain-flattened amplifier exhibits a substantially flat and equal gain for all the wavelengths in the wavelength band of interest.

Figure 1A:
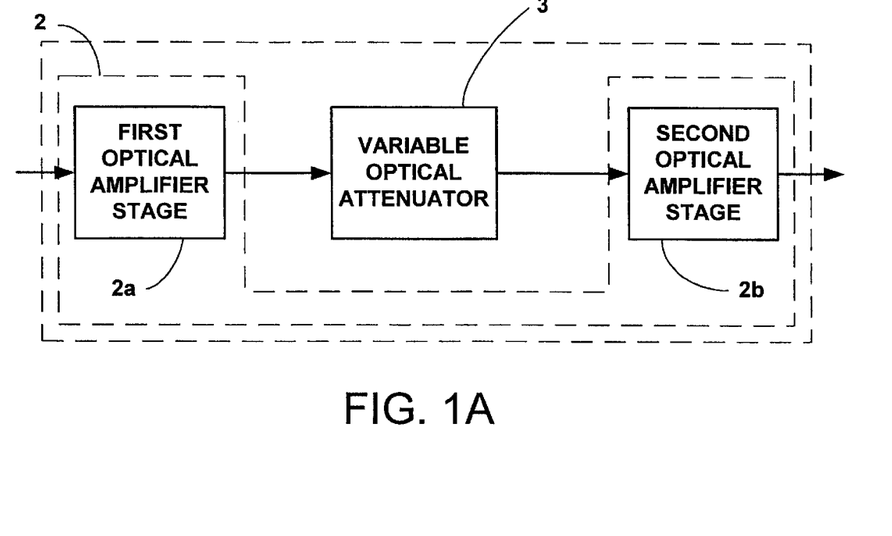
FIG. 1A is a block diagram of a conventional optical amplifier system having a flat spectral VOA.
Figure 1B:
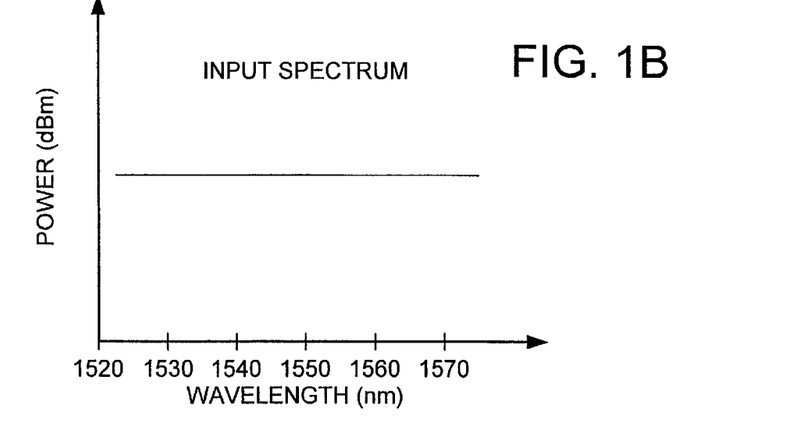
FIG. 1B is a plot of the input signal power as a function of wavelength as input into the conventional optical amplifier system shown in FIG. 1A.
Figure 1C:
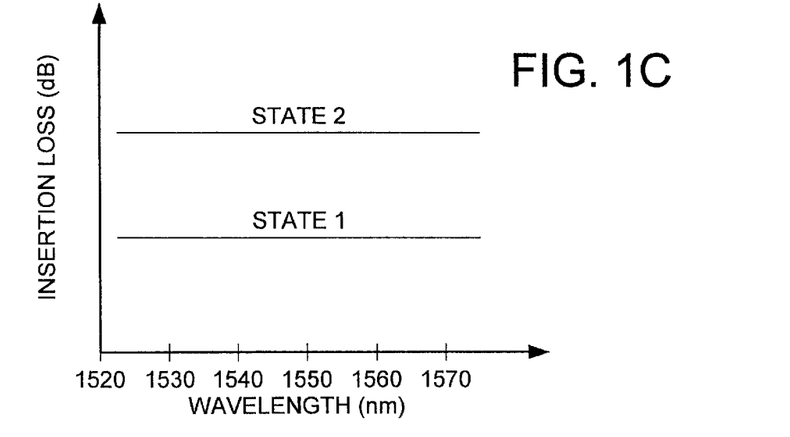
FIG. 1C is a plot of the insertion loss of the conventional VOA of the system shown in FIG. 1A as occurs in two separate states corresponding to an adjustment of the VOA.
Figure 1D:
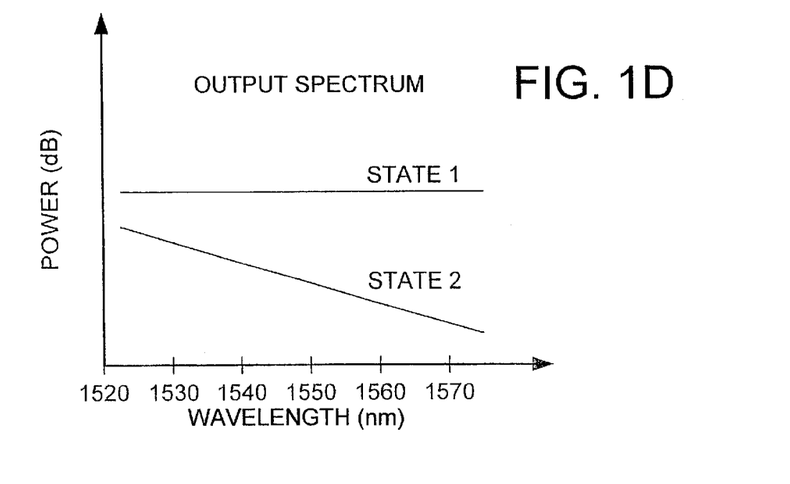
FIG. 1D is a plot of the output power spectrum as a function of wavelength illustrating the gain tilt resulting from the change in states shown in FIG. 1C of the VOA in FIG. 1A.

One of the most important parameters of an optical amplifier, such as an erbium doped fiber amplifier (EDFA), is the slope of the optical gain spectrum. Adjustments to the slope of the optical gain spectrum is often required to accommodate a variety of system operating conditions and amplifier gain transfer functions, such as flattening the gain of the amplifier. The traditional method for achieving slope adjustment is to introduce a variable optical attenuator (VOA) 3 (FIG. 1A) with a spectrally flat response, which is placed in between two amplifier gain sections 2a and 2b. When changing the spectrally flat loss of the VOA, the power, which is coupled from the EDFA gain sections before the VOA to all gain sections following the VOA, changes, thereby affecting the population inversion in those latter stages. This change of the population inversion introduces a change of the gain tilt A, which is defined here as the slope of the best linear fit function $y=A*\lambda+B$ to the spectral shape of the gain. This is illustrated in FIGS. 1B–1D. FIG. 1B shows the input spectrum of the received signals, which is assumed, for this example to be flat. FIG. 1C shows the insertion loss spectrum for the VOA for two different states. Both states shown in FIG. 1C have approximately flat loss characteristics across the relevant spectrum. FIG. 1D shows the output gain spectrum of the amplifier for the two different states of the VOA. As apparent from FIG. 1D, a change in the insertion loss spectrum for this VOA results in a gain tilt change in the output gain spectrum. This gain tilt change approximately corresponds to a variation of gain slope.

The disadvantage of a flat spectral VOA is that a significant average power loss change is required to achieve a significant gain tilt change, which is detrimental in at least two ways. Particularly, average power loss change significantly affects the output signal to noise ratio (OSNR) of the amplifier, and, to maintain a constant output power of an EDFA, the pump power would need to be readjusted. Additionally, the maximum gain tilt A of the EDFA (for constant signal input power) is defined by the minimum loss of the VOA. This also implies that the highest population inversion and therefore the best OSNR occurs always for a maximum gain tilt A.

Figure 2A:
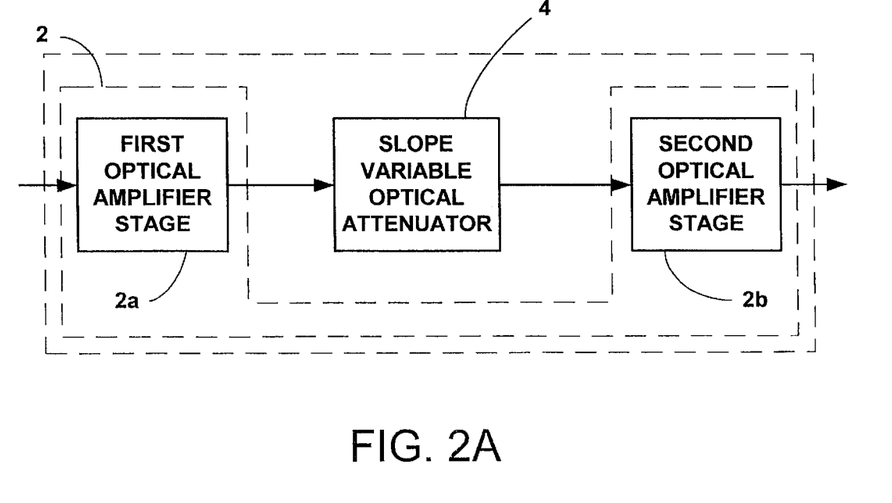
FIG. 2A is a block diagram of a proposed optical amplifier system having a "slope VOA"
Figure 2B:
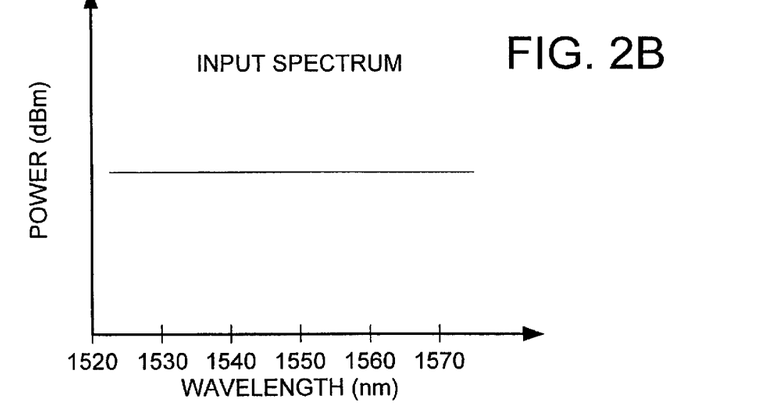
FIG. 2B is a plot of the input signal power as a function of wavelength as input into the optical amplifier system shown in FIG. 2A.
Figure 2C:
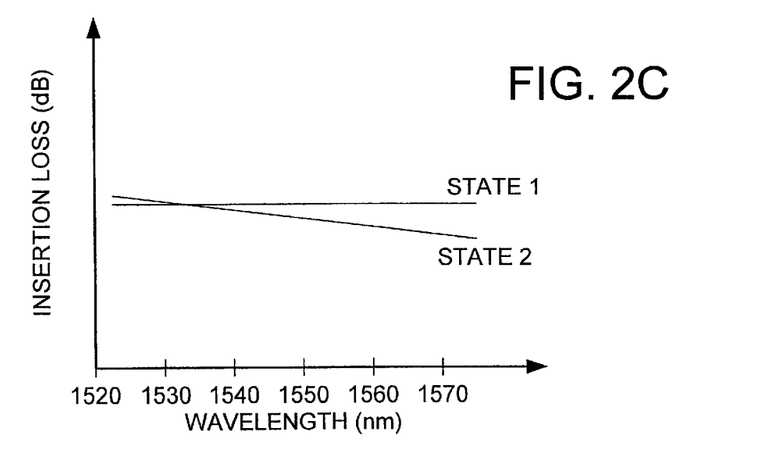
FIG. 2C is a plot of the insertion loss of the VOA of the system shown in FIG. 2A as occurs in two separate states corresponding to an adjustment of the VOA.
Figure 2D:
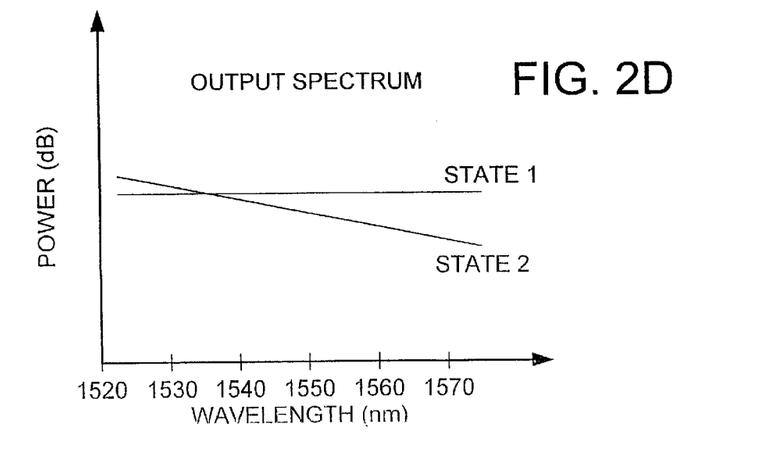
FIG. 2D is a plot of the output power spectrum as a function of wavelength illustrating the gain tilt resulting from the change in states shown in FIG. 2C of the VOA in FIG. 2A.

Recently, new VOA devices have been proposed to circumvent these detrimental effects. The new "slope VOA" device 4 (FIG. 2A) is similarly positioned between amplifier stages 2a and 2b. In these new "slope VOA" devices, which have an approximately linear target spectral response with wavelength, adjustment of the slope of the VOA insertion loss spectrum (FIG. 2C) results in an adjustment of the gain tilt of the amplifier as shown in FIG. 2D.

The mechanism behind the generation of a linear slope change in a "slope VOA" is typically the superposition of two sinusoidal response filters, with a nominal phase difference (center wavelength difference) of 180° (half the free spectral range (FSR)) between them. By adjusting the relative phase and amplitude away from nominal, an approximately linear response can be generated. The advantage of this new "slope VOA" is that the impact on OSNR and pump power readjustment requirements is minimized. This represents an improvement over the flat spectral VOA, but still carries some significant disadvantages. Specifically, these disadvantages include: the linear response is only guaranteed for some maximum phase change, beyond which nonlinearity degrades the gain slope changes into a nonlinear gain change; to achieve a certain level of gain slope change, a roughly equal proportion of excess average insertion loss is introduced; and the number of control parameters required to define the attributes of a "slope VOA" is significant, since the amplitude coupling coefficients and phases for each Fourier component in the interferometer typically requires an independent control. Additionally, both VOA devices described above require an additional gain-flattening filter in the amplifier device to achieve a spectrally flat output signal or gain transfer function for at least one VOA setting.

Thus, there exists the need for an improved optical filter that: (1) is responsive to fewer control parameters to change the gain slope of an amplifier with which the filter is used, (2) provides a linear gain change throughout the operating wavelength band; and/or (3) has a lower average power loss.

SUMMARY OF THE INVENTION

An aspect of the present invention is to provide an optical device having an optical input and output. The optical device comprises an optical amplifier to amplify optical signals received through the optical input of the device, said optical amplifier exhibiting a gain that varies approximately linearly with respect to wavelength in accordance with a gain slope, and a tunable optical filter coupled to the optical amplifier. The optical filter changes the gain slope of the optical amplifier in response to a change in a single parameter of the optical filter.

According to one embodiment of the present invention, the optical filter changes the gain slope of the optical amplifier in response to a change in a central wavelength of the optical filter.

The optical filter may have a pseudo-parabolic spectral filter function. In one embodiment of the invention, the optical filter changes the gain slope of the optical amplifier in response to a change in a central wavelength of the pseudo-parabolic spectral filter function of the optical filter.

According to another embodiment, the single parameter is varied as a function of temperature such that the optical filter compensates for variations in the gain spectrum of the optical amplifier that occur as a function of operating temperature.

Another aspect of the present invention is to provide an optical device having an optical input and output. The optical device comprising an optical amplifier to amplify optical signals received through the optical input of the device, and a tunable optical filter coupled to the optical amplifier. The optical amplifier exhibits a gain that varies approximately linearly with respect to wavelength in accordance with a gain slope. The optical filter changes the gain slope of the optical amplifier in response to a change in a central wavelength of the optical filter.

It is another aspect of the present invention to provide a method of varying the slope of the gain spectrum of an optical amplifier. The method comprising the steps of (a) coupling a tunable optical filter to the optical amplifier, the optical filter having a spectral filter function that is substantially non-linear throughout the operating waveband of the optical amplifier and defines a central wavelength; and (b) adjusting the central wavelength of the optical filter until a desired gain slope adjustment results.

According to another aspect of the present invention, an optical filter is provided for an optical device that exhibits at least two different gain states. The optical filter comprises a tunable filter component that changes its spectral filter function between at least two different states corresponding to the at least two different gain states of the optical device in response to a change in a single parameter of the optical filter.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENTS

Reference will now he made in detail to the present preferred embodiment of the invention, an example of which is illustrated in the accompanying drawings. Wherever possible, the same reference numerals will be used throughout the drawings to refer to the same or like parts.

Figure 3:
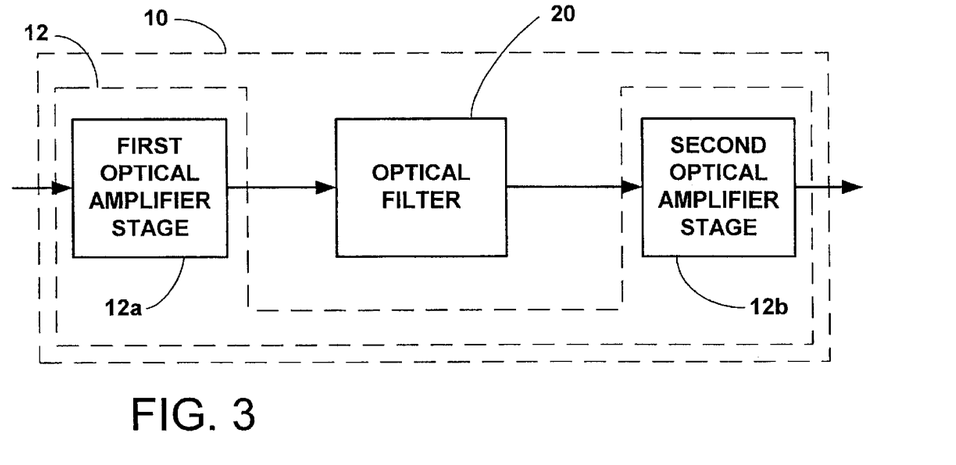
FIG. 3 is a block diagram of an optical amplifier system constructed in accordance with one embodiment of the present invention.

FIG. 3 shows an optical device in the form of an optical amplifier system 10 constructed in accordance with the present invention. As shown, optical amplifier system 10 includes an optical amplifier 12 and an optical filter 20. Optical amplifier 12 includes a first stage 12a and a second stage 12b each including an amplifying medium, such as a coil. Such a coil may, for example, be an Erbium doped fiber of an Erbium doped fiber amplifier (EDFA). Optical filter 20 is preferably coupled between amplifier stages 12a and 12b and preferably includes the novel variable attenuator described below. Although the inventive optical filter is described below for use with a two-stage optical amplifier, it may also be used with an amplifier having more stages or with any other optical device or component.

The present invention exhibits the same advantages of a "slope VOA" and minimizes the average power loss to achieve a certain gain slope change. As noted above, a "slope VOA" is a VOA with a slope that is adjustable. The present invention also reduces the number of control parameters required for the device to a single parameter and is still capable of providing a better linear gain slope change, if required. In the preferred embodiment described below, the single control parameter that affects the linear gain slope change is the center wavelength of the spectral filter function.

Figure 4A:
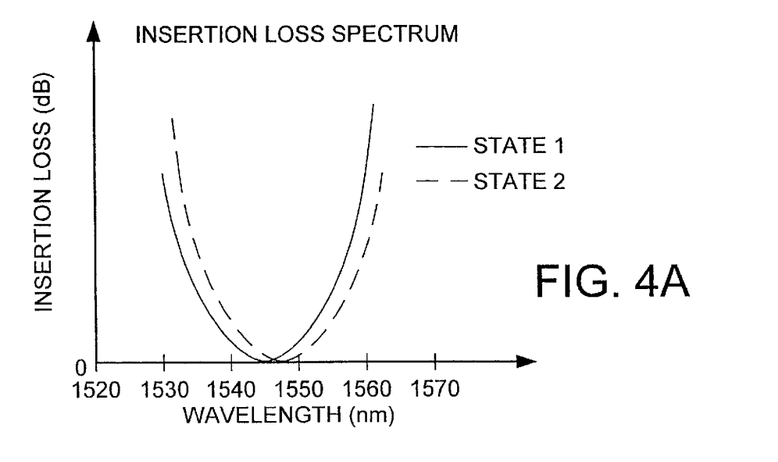
FIG. 4A is a plot of the insertion loss spectrum for the inventive filter used in the embodiment shown in FIG. 3 both with and without a center wavelength shift.
Figure 4B:
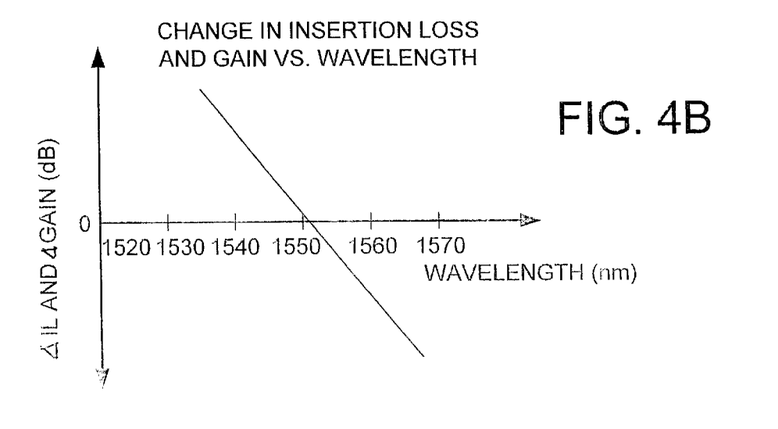
FIG. 4B is a plot of the change in insertion loss and the change in gain as a function of wavelength.

The inventive device is essentially a tunable filter having an insertion loss spectrum having a substantially non-flat spectral shape. In the preferred embodiment, the only parameter of the filter that needs to be adjusted to obtain a desired spectral gain change is the center wavelength, whose tuning range is determined by the required EDFA gain slope change. The filter has a very specific stationary insertion loss function over this spectral range of operation, which typically consists of the EDFA bandwidth plus the desired tuning range. The first derivative of the insertion loss function with wavelength corresponds to, or should closely resemble, the desired target spectral gain change of the amplifier. For example, if a linear spectral gain change is desired (as in the above example of the "slope VOA"), then the ideal filter shape would closely resemble a parabola or similar shape (also referred to herein as a "pseudo-parabola") whose minimum or maximum is near the center wavelength of the gain spectrum of the amplifier. Such a spectral filter function and its corresponding loss spectrum change induced by a simple wavelength shift of the filter are illustrated in FIGS. 4A and 4B. In contrast to the "slope VOA," only the change of the spectral shape of the filter is linear.

Figure 5A:
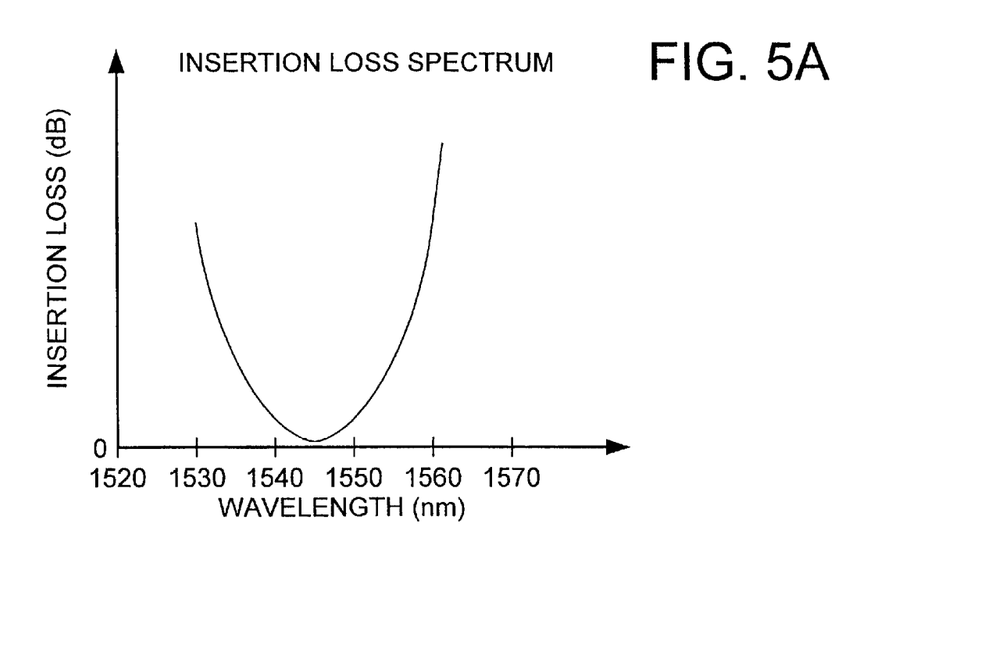
FIG. 5A is a plot of the insertion loss spectrum having a sinusoidal filter function exhibited by a filter constructed in accordance with an embodiment of the present invention.
Figure 5B:
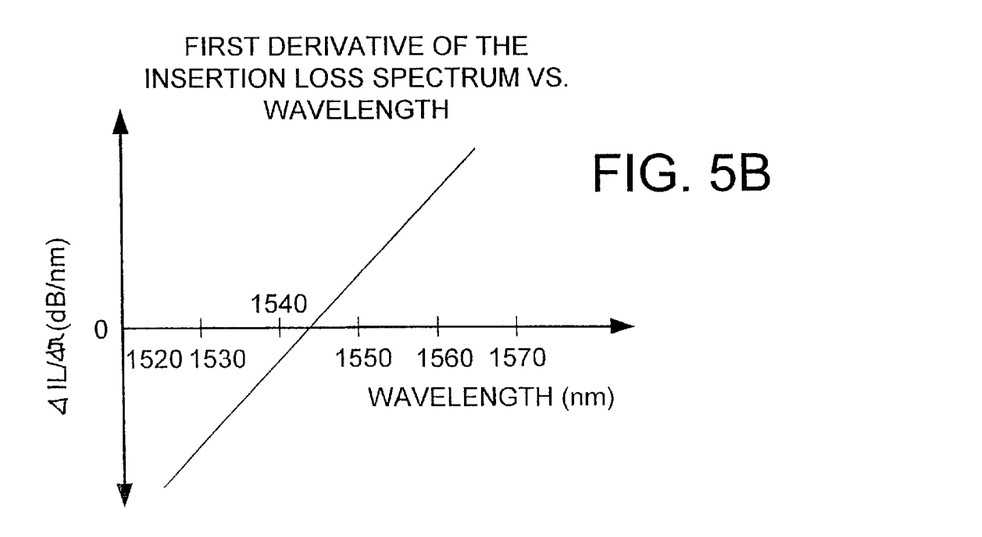
FIG. 5B is a plot of the first derivative of the insertion loss spectrum as a function of wavelength.

While the preferred embodiment mentioned above and described in detail below pertains to a parabolic spectral filter function, it will be appreciated by those skilled in the art that other shapes may be utilized that approximate a parabola or that have an entirely different shape. Such functions should preferably have a symmetry about a central wavelength. Nevertheless, asymmetrically shaped functions may be useful for certain applications. With respect to a parabolic spectral filter function, a single sinusoidal filter with fixed amplitude and FSR centered on the gain spectrum is a satisfactory approximation to a parabola. A filter phase adjustment (which induces a center wavelength shift) alone will result in an approximately linear gain spectral change. This is because the derivative of the filter is approximately a linear function of wavelength in the considered spectral bandwidth. This phenomenon is illustrated in FIGS. 5A and 5B.

It should be noted that the target spectral gain change is not limited to a linear function of wavelength, but rather is constrained only by the complexity of the filter shape available. The device of the present invention is intended to have a simplified construction and therefore multiple filter terms (Fourier terms for sinusoidal filters) are not considered, although they would enable more complex gain changes. To determine the required filter function, which is necessary to achieve a given spectral gain change with the inventive filter, one need only to integrate the desired gain change function.

Figure 6:
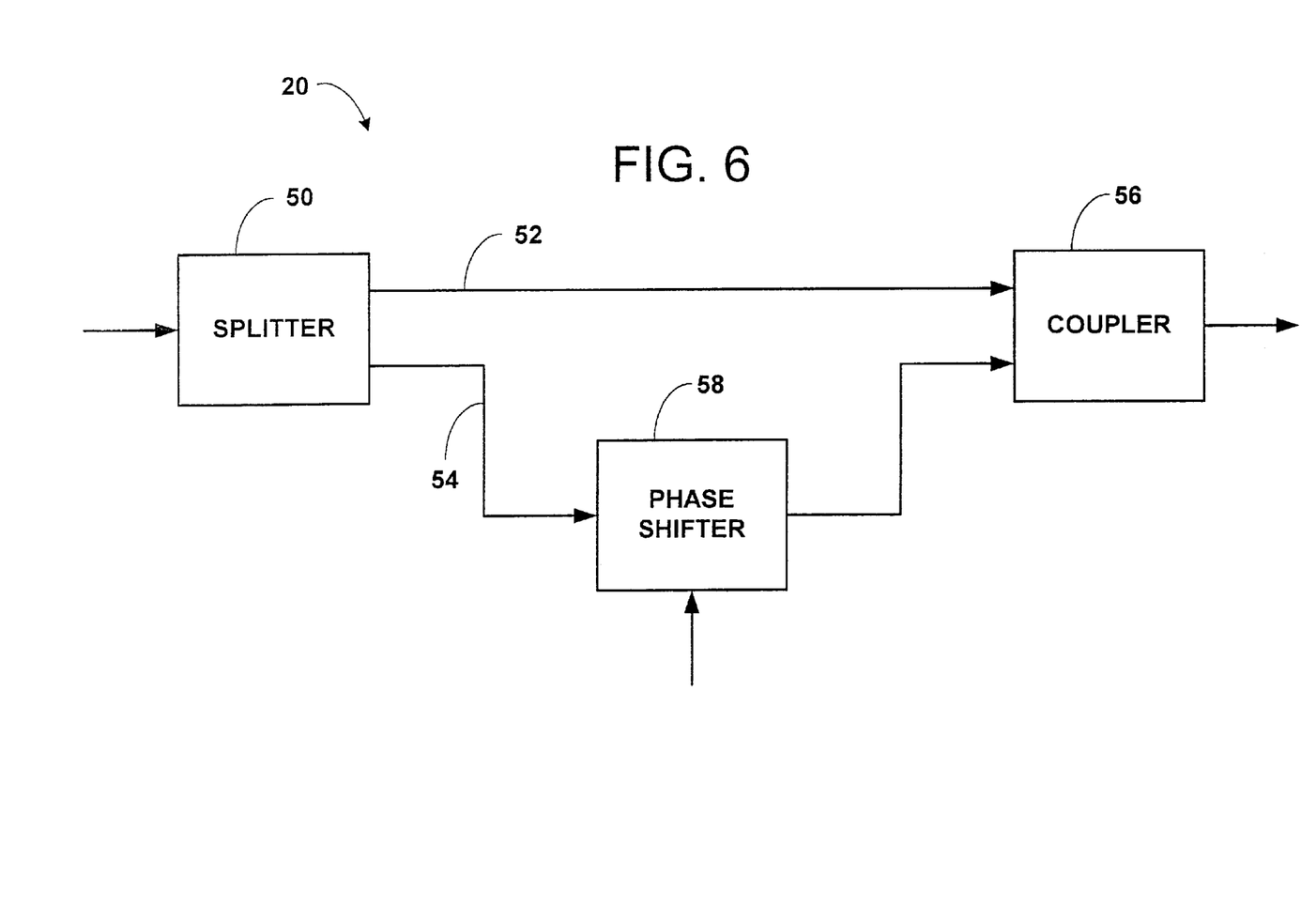
FIG. 6 is a block diagram of a Mach-Zehnder interferometer that may be implemented as the tunable filter of the present invention.

FIG. 6 shows an example of a construction that may be used to construct the filter 20 (or variable VOA) of the present invention. As shown, filter 20 may be implemented using a Mach-Zehnder interferometer configured to produce a raised cosine function. Such an interferometer over a limited operating wavelength band, provides a substantially parabolic spectral filter function. As illustrated in FIG. 6, such a Mach-Zehnder interferometer includes a splitter 50, which splits the incoming signal to propagate along two arms 52 and 54 of the interferometer. A coupler 56 is provided to couple the ends of the two arms thereby causing interference of the signals propagating through the two arms. The resultant signal is provided at an output of the interferometer. One of the first or second arms of the interferometer has a phase shifter 58 that provides that arm with a different optical path length than the other arm so as to introduce a phase delay in one of the two signals that are coupled together by coupler 56. To allow this interferometer to be implemented as a tunable filter, the phase delay in one of the two arms of the interferometer may be adjustable. By changing the relative phase delay between the two arms, the center wavelength at which the most destructive interference occurs can be made to shift (or at which the most constructive interference occurs depending upon the phase). The interferometer may use any well-known phase shifting means for varying the phase delay in one of the two arms of the interferometer. The Mach-Zehnder interferometer shown in FIG. 6 is preferably configured to produce an interference signal at its output, which attenuates signals in accordance with a spectral filter function that resembles a parabola. The central wavelength of this filter function corresponds to the minimum of the parabola and may be shifted by adjusting the relative phase of one or both of the arms of the Mach-Zehnder interferometer. As will be appreciated by those skilled in the art, the parabola is derived from a cosine function, and hence the central wavelength could correspond to a maximum of the portion of the cosine function that lies within the limited operating wavelength band. It may be useful in some applications to use an inverted approximated parabolic filter function whereby the central wavelength corresponds to the maximum of the parabola.

Figure 12:
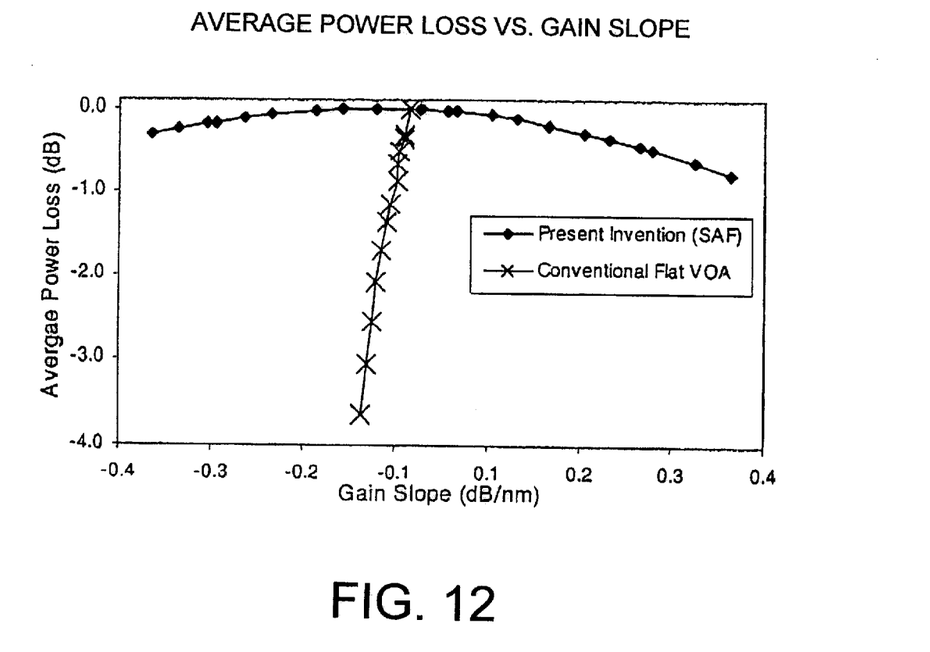
FIG. 12 is a comparative graph of the average power loss as a function of gain slope for the inventive filter and a conventional flat VOA.
Figure 13:
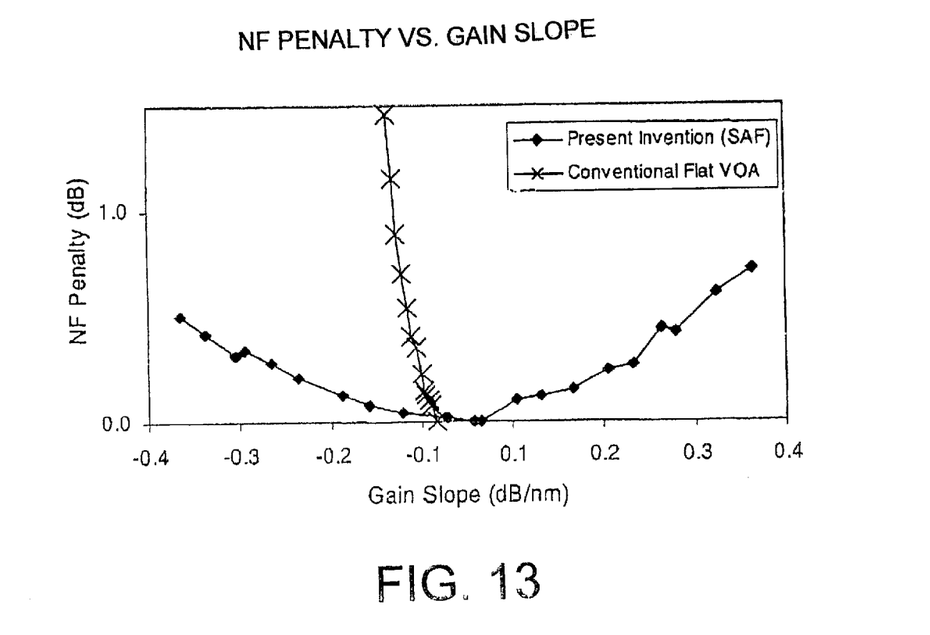
FIG. 13 is a comparative graph of the NF penalty as a function of gain slope for the inventive filter and a conventional flat VOA.

The filter of the present invention exhibits several features and advantages over the conventional flat spectral VOA and the "slope VOA." Specifically, the slope of the filter may be adjusted without significant impact on performance (i.e., without NF change and ripple change penalties). See, for example, FIGS. 12 and 13. Further, compared to standard VOAs, "bottoming out" associated with a loss of dynamic range, does not exist in the filter of the present invention because the center wavelength is shifted from side to side to provide its dynamic range. Additionally, the adjustment of spectral gain shape, especially the gain slope, is achieved by adjusting only one parameter, such as the center wavelength (or filter phase). This reduces the number of control signals and adjustments required to an absolute minimum. Also, this filter enables gain slope adjustment under some circumstances using a look-up table, without necessitating measurement of the filter transmission spectrum because the filter transfer function can be designed to be very predictable as a function of the phase adjustment. Additionally, the necessary minimum loss or average power loss of the filter to provide a certain gain slope change can be significantly smaller than a comparable "slope VOA." Filter functions, which are symmetric about some center wavelength in the bandwidth of the EDFA, can be designed so that the average power loss of the filter remains constant (or at least changes are insignificant) throughout the tuning range (as excess loss disappears at one end of the spectrum, it is added on the other) provided the wavelength about which symmetry occurs remains within the bandwidth of the EDFA. This approximately constant average power loss provides an approximately constant average loss throughout the amplifier, therefore maintaining an approximately constant population inversion and constant pump power requirement, even though a change of the spectral gain is induced (in the homogeneously broadened gain approximation). The additional spectral insertion loss function of the filter can offset part of the gain-flattening filter (GFF) requirement for the amplifier, thereby reducing the depth and/or slope of the required GFF shape when using the VOA device as described above. This filter can introduce any spectral gain shape, which can be described by $df/d\lambda \sim K^*(S_1(\lambda) - S_0(\lambda))$, with $S_0(\lambda)$ and $S_1(\lambda)$ the starting point and ending point of the spectral gain shapes (which correspond to two center wavelength settings of this device, $\lambda_0$ and $\lambda_1$, respectively), $f(\lambda)$ the spectral filter function, and $0 < K \leq 1$. The filter can be designed so that the minimum average insertion loss of the device occurs for any required gain tilt (i.e., even for the smallest required gain tilt parameter A (largest negative number for A)), which is also not possible with the VOA devices described above. Additionally, the inventive optical filter may be designed so that the minimum average insertion loss of the device occurs for any required gain slope setting, i.e., even for the smallest required gain slope, which is not possible with the prior VOA devices described above as that would impose a requirement for more baseline loss.

One problem that arises through the use of optical amplifiers and, in particular, EDFAs, is that the gain spectrum tends to vary with fluctuations in the operating temperature. Such optical amplifiers may be exposed to operating temperatures ranging from −5° C. to 75° C. Unless otherwise compensated, the gain spectrum of the optical amplifier will change significantly with temperature. In general, all components in the amplifier contribute to this variation, but the dominant contributions are typically from the gain medium (i.e., the erbium-doped fiber coil).

Figure 7:
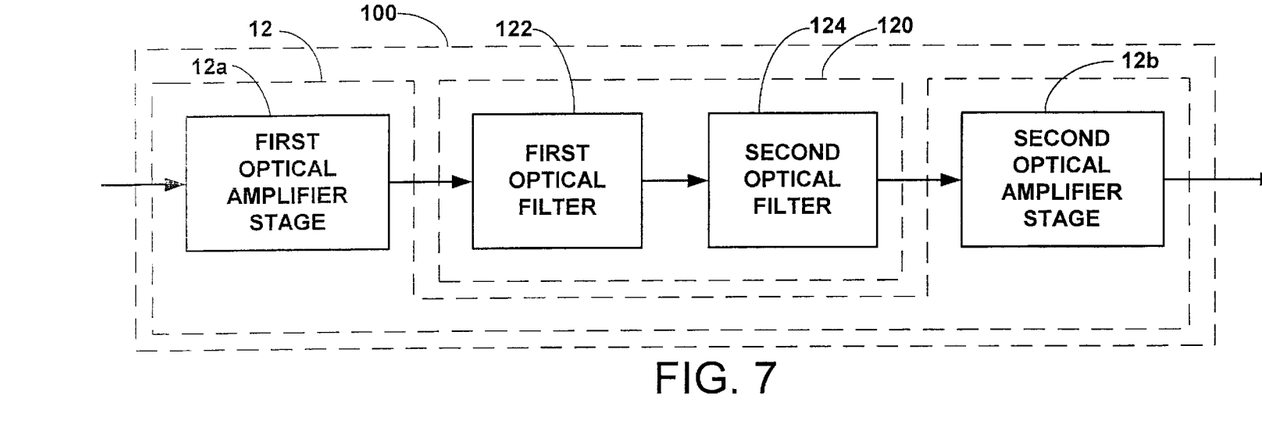
FIG. 7 is a block diagram of an optical amplifier system constructed in accordance with another embodiment of the present invention.

FIG. 7 shows an optical device in the form of an optical amplifier system 100 constructed in accordance with another embodiment of the present invention. In this particular example, an optical filter is provided for compensating for these thermal gain variations, which are also known as "thermal wiggle" or "thermal ripple."

As shown in FIG. 7, optical amplifier system 100 includes an optical amplifier 12 and a gain-flattening filter 120. As will be described further below, gain-flattening filter 120 preferably includes a first optical filter 122 and a second optical filter 124, and optical amplifier 12 includes a first stage 12a and a second stage 12b each including an amplifying medium, such as a coil. First and second optical filters 122 and 124 are coupled between the input and the output of the optical device and are preferably coupled in series between stages 12a and 12b.

Figure 8:
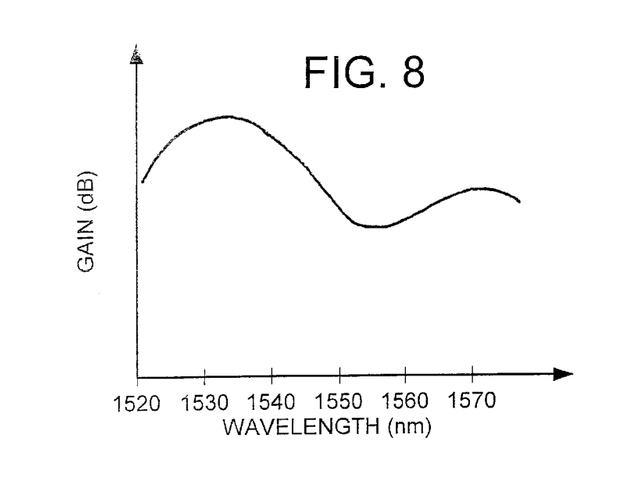
FIG. 8 is a graph showing the gain of a typical optical amplifier as a function of wavelength.

FIG. 8 is a plot of the gain of optical amplifier 12 as a function of wavelength. As illustrated, the gain of optical amplifier 12 is not flat, but rather is a function of wavelength.

Figure 9:
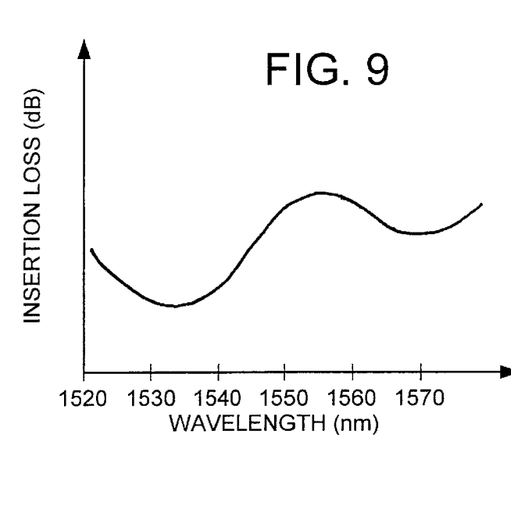
FIG. 9 is a graph showing the transmission characteristics as a function of wavelength for a gain-flattening optical filter constructed in accordance with the present invention.

FIG. 9 is a plot of the insertion loss with respect to wavelength $\lambda$ for an ideal gain-flattening filter 120 when used with an optical amplifier 12 having the gain spectrum illustrated in FIG. 8. As will be apparent to those skilled in the art, if a gain-flattening filter 20 were combined with such an optical amplifier 12, the output of the optical amplifier system 10 would exhibit uniform gain across the wavelength band of interest.

Figure 10:
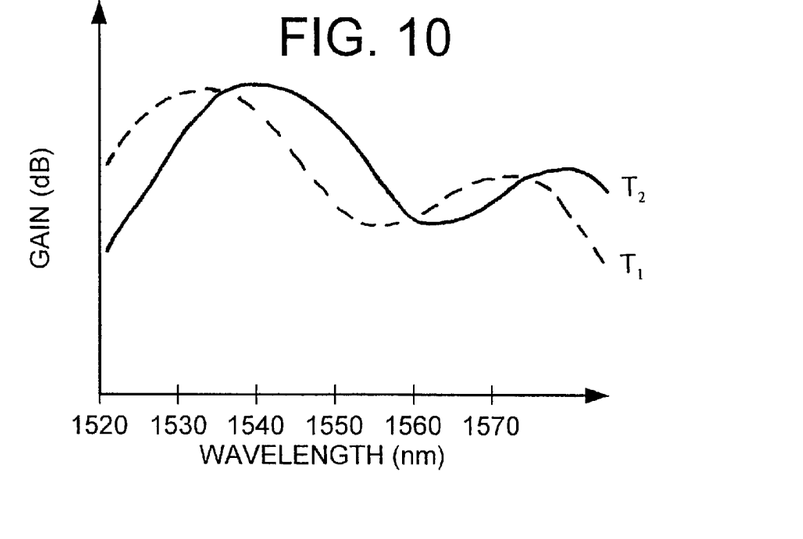
FIG. 10 is a graph showing the variation in the gain spectrum caused by a shift in the operating temperature.

FIG. 10 shows two plots of the gain spectrum (i.e., gain as a function of wavelength) of optical amplifier 12 each taken at different operating temperatures $T_1$ and $T_2$. As apparent from FIG. 10, the gain spectrum of optical amplifier 12 changes shape with changing temperature.

Figure 11:
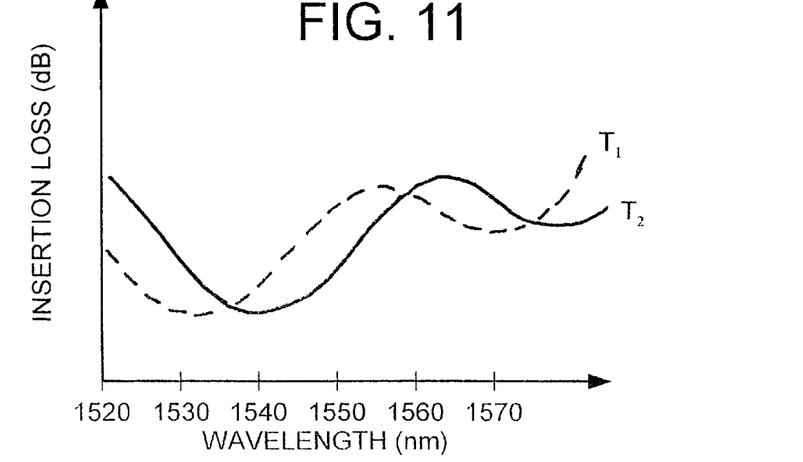
FIG. 11 is a graph illustrating the variation in the transmission spectra of a gain-flattening optical filter constructed in accordance with the present invention caused by a corresponding shift in operating temperature similar to that affecting the gain spectrum shown in FIG. 10.

Rather than utilizing a heating or thermal control system as described above, the optical amplifier system 100 employs a gain-flattening filter 120 that is designed to experience a shape change in its insertion loss spectrum (i.e., insertion loss as a function of wavelength) as the operating temperature changes that corresponds to a shape change in the amplifier gain spectrum. An example of an ideal gain-flattening filter for use with an optical amplifier having the gain spectrum shown in FIG. 10 is illustrated in FIG. 11. Thus, the gain-flattening filter 120 of the present invention has a loss spectrum that is a function of not only wavelength, but temperature, so as to track the changes in the gain spectrum resulting from a change in operating temperature. This solution is described mathematically as follows.

First, the rate of thermal gain change of the amplifier is measured by measuring the gain G of optical amplifier 12 at a first temperature $T_1$ and then again measuring the gain of optical amplifier 12 at a second temperature $T_2$. The rate of thermal gain change is thus approximated as:

$$\frac{\Delta G}{\Delta T} = \frac{G(T_2) - G(T_1)}{T_2 - T_1}$$

This approach to the design of the gain-flattening filter 120 assumes a linear change of amplifier gain with temperature. In reality, the gain change is not strictly linear, nor is the gain shape change the same from one wavelength to the next. Moreover, the gain shape change at one wavelength is not related by a simple scaling of the gain shape change in another wavelength. Despite these caveats, however, the assumption of linearity is sufficiently good to permit substantial cancellation of thermal gain variation over a wide range of temperatures.

For an ideal optical amplifier system 100, the net gain of the system $G_{net}$ ($G_{net}$ is erbium gain minus the gain flattening filter insertion loss spectrum) should not vary substantially with changes in temperature T. Thus, gain-flattening filter 20 should be designed such that $$\frac{dG_{net}}{dT} = 0.$$

To obtain this result, the first order derivative $$\left(\frac{dL}{dT}\right)$$

of the filter insertion loss (L) with respect to operating temperature must be substantially equal to the linearized first order derivative $$\left(\frac{dG}{dT}\right)$$

of the gain of the optical amplifier with respect to the operating temperature.

As noted above, we can determine the value of $$\frac{dG}{dT}$$

simply by measuring the gain spectrum of the optical amplifier at different temperatures over an operating temperature range.

As shown in FIG. 7, gain-flattening filter 120 may include a first optical filter 122 and a second optical filter 124. Two such filters are preferably utilized to make the overall gain-flattening filter more practical to design. More specifically, first optical filter 122 may be designed to have an athermalized insertion loss spectrum (i.e., an insertion loss spectrum that is substantially stable over the operating temperature range) while second optical filter 124 may be designed to have an insertion loss spectrum that varies substantially as a function of operating temperature. In this manner, the sum of optical filters 122 and 124 may be designed for optimal gain flattening as a result of wavelength without concern for the extent of thermal ripple of optical amplifier 12. Second optical filter 124 is designed with the aim to closely match the thermal gain variation of optical amplifier 12 without as much concern for compensating for the change in gain as a function of wavelength. Thus, the insertion loss spectra of first and second optical filters 122 and 124 are additive and thereby combine to compensate for variations in the gain of optical amplifier not only as a function of wavelength but also as a function of operating temperature.

The aggregate gain-flattening filter insertion loss spectrum (L) is equal to the sum of the insertion loss $L_1$ of first optical filter 122 and the insertion loss $L_2$ of second optical filter 124 (i.e., $L=L_1+L_2$). The net gain of $G_{net}$ of optical amplifier system 100 is thus equal to the gain G of optical amplifier 12 minus the insertion loss $L_1$ of first optical filter 122 minus the insertion loss $L_2$ of second optical filter 24 (i.e., $G_{net}=G-L_1-L_2$). Because $L_1$ does not vary with temperature $$\left(\frac{dL_1}{dT}=0\right),$$

the following equation should hold true:

$$\frac{dG_{net}}{dT}=\frac{dG}{dT}-\frac{dL_2}{dT}=0$$

The second filter insertion loss spectrum $L_2$ is a function of wavelength $\lambda$ and thermal dependence function $\lambda_0(T)$.

The second filter spectrum $L_2$ ($\lambda-\lambda_0(T)$) and thermal filter spectral shape change is designed such that:

$$\frac{d\lambda_0}{dT}\cdot\frac{dL_2}{d\lambda}=-\frac{dG}{dT}$$

Here, the thermal dependence of the second filter spectrum is assumed to be entirely contained within the term $\lambda_0(T)$. This implies that the entire filter spectrum shifts bodily with respect to wavelength when the temperature changes. For most cases, $\lambda_0$ changes approximately linearly with temperature and, for some structures, increases with increasing temperature, and for other structures decreases with increasing temperature.

To design a gain-flattening filter having the desired characteristics, first optical filter 122 may be designed using conventional techniques to ensure that it does not have an insertion loss spectrum that varies with respect to temperature while compensating for a significant portion of the gain of optical amplifier as a function of wavelength. For example, first optical filter 122 may be a conventional athermalized dielectric multi-layer thin film stack or an athermalized fiber Bragg grating (FBG). A FBG may be athermalized by mounting the end supports for the FBG to a substrate having a negative coefficient of expansion that counters that of the FBG. A dielectric multi-layer thin film stack typically includes alternating layers of a first material having a high index of refraction and a second material having a low index of refraction.

Second optical filter 124 preferably is responsive to a single parameter to change its gain characteristics and hence maintain the gain characteristics of the system 100 as the operating temperature changes. Second optical filter 124 may be a FBG. Such FBGs include an optical fiber having a plurality of substantially equally spaced changes in refractive index. A substrate having a pair of supports is used to hold the fiber on opposite sides of the grating. In general, as the fiber is exposed to increasing operating temperature, the fiber undergoes thermal expansion to expand linearly, which correspondingly increases the periodic spacings between the refractive index changes of the grating. The increase in these spacings changes the insertion loss spectrum of the FBG. By controlling the thermal expansion of the FBG, changes in the insertion loss spectrum as a function of operating temperature may be controlled. The thermal expansion of the FBG can be controlled through the selection of the materials of which the fiber and the support substrate are made.

The present invention as described further provides a method of compensating for variations in the gain spectrum of an optical amplifier that occur with fluctuations in operating temperature. The method includes the steps of providing an optical filter having an insertion loss spectrum that varies with fluctuations in operating temperature, and positioning the optical filter in the optical path of the optical amplifier.

While the above invention has been described with respect to an optical amplifier including an Erbium doped fiber, the invention is equally applicable to a discrete or distributed Raman amplifier, as well as other forms of amplifiers.

Also, although the present invention has been described above as providing an average power loss that remains substantially constant throughout its tunable range, the filter may be used in optical systems where the filter may only need to exhibit substantially constant average power loss at two or more discrete intervals or states of a pertinent parameter. In other words, the inventive optical filter may have two or more discrete states that provide two or more corresponding discrete gain spectra. For example, one discrete state may be the gain spectra for a first temperature (e.g., the gain spectra of an Erbium coil at 0° C.) and another state may be the gain spectra for a second temperature (e.g., the gain spectra of an Erbium coil at 70° C.) when used as a thermal ripple flattening filter. Thus, a single parameter of the filter (i.e., center wavelength of the filter) may be shifted (by stretching a FBG, twisting a coupler, etc.) to produce at least two discrete and unique gain spectra using an arbitrarily shaped filter whose filter shape is derived from the difference function between the two states. In such a manner, the loss of the filter may be shifted to compensate for the difference in the amplifier gain spectrum at two or more different temperatures.

If the optical filter were optimized to provide the smallest error between two discrete states, a two-state system could be nearly perfectly compensated. If the function (i.e., the gain spectrum as a function of temperature) were a linear interpolation between the two gain spectra at the two discrete states, then it would work for all states in between provided the filter were linear. If the system only required the filter to exhibit two discrete gain spectra, neither the gain spectra nor the filter function need be linear between the two discrete states, but only need to appear linear at the two states. Thus, the optical filter could function as a two-state optical filter switch.

Another example where the inventive optical filter may be implemented as a two-state filter, is when the filter is used in a Raman application. If there is a Raman in the optical fiber span of an optical system, the amplifier operates in the C-band alone, and one wishes to upgrade the span to include the L-band, or vice versa, more pumps must be added and a filter must be added to re-equalize the gain. However, one would typically have to either shut the system down to insert a new gain-flattening filter or have utilized a very expensive dynamic gain-flattening filter to re-equalize the channels. The inventive filter, however, may be used as a two-state optical switch filter that selectively provides either a filter spectrum $f_1(\lambda)$ that is optimal for the C-band or a filter spectrum $f_2(\lambda)$ that is optimal for the C- and L-bands. In this manner the system may be upgraded to include an additional L or C band simply by shifting the single parameter (central wavelength) of the filter function without taking the system down and at a very low cost and low complexity.

Examples of functions that are not necessarily linear, but may, in some circumstances, be closely approximated by linear interpolation between two discrete gain spectra include "thermal wiggle," which is the gain spectrum of the Erbium coils as a function of temperature, C-band vs. C- and L-band upgrades, and "spectral hole burning" where the gain spectrum of the amplifier depends on the total or the individual channel paths going in. An optical amplifier having a well-populated input signal of high power (i.e., 56 channels at 0 dBm) will cause significant spectral hole burning or inhomogeneous broadening of the gain spectrum, and if the number of channels or power is reduced substantially, the gain spectrum of the amplifier will change because spectral hole burning will be weaker. To perfectly compensate for these two extremes, a two-state filter can be designed according to the present invention whose derivative corresponds to the difference in the gain spectra for the two spectrally hole burned or less spectrally hole burned gain spectra in the amplifier.

Thus, generally speaking, the center wavelength of the optical filter may be adjusted as a function of the input spectral signal content to the optical amplifier. The optical filter may change the gain slope or shape of the optical amplifier in response to: (1) a change in the input spectral signal content that occurs as a result of variations of loss in an optical fiber span of an optical system in which the optical amplifier is utilized; or (2) a change in the spectral signal content of the optical system that occurs as a result of variations of Raman gain in an optical fiber span of the optical system. The Raman gain may vary as a result of changes in span length, or optical fiber composition, or as a result of an upgrade to the optical system through additionally populating the optical input signal to the optical amplifier with more or less channels of significantly increased or decreased spectral extent or spectral power density (e.g., moving from C-band to C-plus L-band operation or vice versa which is known to produce inter-band Raman gain and intra-band Raman gain).

If the optical amplifier is an Erbium doped amplifier, the optical filter may change the gain slope or shape of the Erbium doped amplifier in response to a change in the spectral signal content of the optical system that occurs as a result of variations of Erbium doped amplifier gain in the Erbium doped amplifier of the optical system. The Erbium doped amplifier gain may vary as a result of optical amplifier fiber length, or optical amplifier fiber composition, or as a result of an upgrade to the optical system through additionally populating the optical input signal to the Erbium doped amplifier with more or less channels of significantly increased or decreased spectral extent or spectral power density (e.g., moving from C-band to C-plus L-band operation or vice versa or from a low channel count to a high channel count or change in the channel power distribution as a result of an add/drop operation, which is known to produce gain intra-band and inter-band changes due to homogeneous saturation (population inversion changes) and inhomogeneous saturation (spectral hole burning).

While the optical filter of the present invention may be used to switch the gain shape between two or more defined spectral shapes using different gain slopes, the optical filter could be used to achieve any gain shape change with a simple wavelength shift of the filter spectral shape.

The optical filter of the present invention may be a multi-clad coupler based device, a planar waveguide based device, a fiber Bragg grating (FBG) based device, a fused bi-conic taper coupler based device, or a micro-optic device. Such a micro-optic device may include micro-lenses and birefringent crystals for providing splitting and recombination into the couplers. The phase accumulation, advance and retardation may be achieved using a class of electro-optic materials including, but not limited to, OPTOCERAMIC™ materials, and preferably PLZT materials, such as lead zirconate titanate.

The optical filter device preferably is implemented as a monolithic continuous unbroken optical path. The light never physically leaves the optical fibers, the light expands through couplers, however the device is monolithic, and there are no Fresnel discrete reflections, there are no substantially different optical materials, etc. This makes the device uniquely capable of handling high optical power. The device may have a significant advantage in 40 GB/s system because the Fresnel reflections that would otherwise be present, introduce insertion loss ripple that creates a group delay ripple effect. By eliminating these reflections, the inventive device does not suffer from the above-noted problems associated with such reflections.

As will be apparent to those skilled in the art, an optical filter may be constructed in accordance with the present invention to compensate for anything that changes the gain spectrum of an optical device in a substantially systematic way that can be measured.

The optical filter of the present invention is suitable for high-bit rate (i.e., 40 GB/s) applications due to very low excess loss, return loss, PDL, PMD, IL, ripple, dispersion and group delay ripple, a continuously unbroken path (when implemented as a monolithic waveguide device), both C-band and L-band capability, and may be used for Raman applications.

The inventors have assembled programmable fiber optic Mach-Zehnder devices capable of providing the functionality described above. The Mach-Zehnder interferometers are fabricated using two fibers of which the cores have different diameters and numerical apertures, such as disclosed in D. A. Nolan and W. J. Miller, "Wavelength Tuned Mach-Zehnder Device," Optical Fiber Conference 1994, San Jose, Calif. This difference provides for two different optical paths, since the propagation constants of the cores are different. During the fabrication process, the fibers are mid-stripped of their plastic coatings and inserted into a glass tube. The tube has an index lower than that of silica. The composite device is tapered twice in order to provide for two 3 dB couplers. The region between the couplers is on the order of 4 cms and is bent on the order of 100 microns in order to tune the center wavelength of the slope-adjusting filter. The device is robust and environmentally stable. The total typical insertion loss of these interferometers is on the order of 0.5 dB. The assembled device is mechanically stable and tuning is achieved using a small dual-phase stepper motor to provide motion to tune the filter center wavelength and on optical potentiometer to provide position feedback. A small electronic driver provides motor control and amplifies the potentiometer signal. Control of the device can be managed by a simple increment/decrement of the stepper motor to control the center wavelength.

It will become apparent to those skilled in the art that various modifications to the preferred embodiment of the invention as described herein can be made without departing from the spirit or scope of the invention as defined by the appended claims.

The invention claimed is:

1. An optical device having an optical input and output for use in a communication system operating within a communication band, said optical device comprising:
  an optical amplifier to amplify optical signals received through the optical input of the device, said optical amplifier exhibiting a gain that varies approximately linearly with respect to wavelength in accordance with a gain slope; and
  a tunable optical filter coupled to said optical amplifier, said optical filter changes the gain slope of said optical amplifier in response to a change in a single parameter of said optical filter, wherein said optical filter exhibits a pseudo-parabolic insertion loss function having a substantially non-linear region falling within the communication band.

2. The optical device of claim 1, wherein said optical filter changes the gain slope of said optical amplifier in response to a change in a central wavelength of the pseudo-parabolic insertion loss function of said optical filter.

3. The optical device of claim 1, wherein the single parameter is varied as a function of temperature such that said optical filter compensates for variations in the gain spectrum of said optical amplifier that occur as a function of operating temperature.

4. The optical device of claim 1, wherein said optical device is a monolithic device.

5. The optical device of claim 1, wherein said optical filter is at least partially implemented using a multi-clad waveguide.

6. The optical device of claim 1, wherein said optical filter is at least partially implemented in a planar waveguide.

7. The optical device of claim 1, wherein said optical filter has a spectral filter function that is substantially symmetric about a central wavelength.

8. The optical device of claim 7, wherein said optical filter has an average power loss that remains substantially constant throughout its tunable range.

9. An optical device having an optical input and output, said optical device comprising:
  an optical amplifier to amplify optical signals received through the optical input of the device, said optical amplifier exhibiting a gain that varies approximately linearly with respect to wavelength in accordance with a gain slope; and
  a tunable optical filter coupled to said optical amplifier, said optical filter changes the gain slope of said optical amplifier in response to a change in a single parameter of said optical filter, wherein said optical filter has a pseudo-parabolic insertion loss function,
  wherein said optical filter is a Mach-Zehnder interferometer and the single parameter that is changed is a relative phase accumulation between two arms of said Mach-Zehnder interferometer.

10. An optical device having an optical input and output for use in a communication system operating within a communication band, said optical device comprising:
  an optical amplifier to optical signals received through the optical input of the device, said optical amplifier exhibiting a gain that varies approximately linearly with respect to wavelength in accordance with a gain slope; and
  a tunable optical filter coupled to said optical amplifier, wherein said optical filter has a spectral filter function that is substantially symmetric about a central wavelength falling within the communication band, and said optical filter changes the gain slope of the optical amplifier in response to a change in the central wavelength.

11. The optical device of claim 10, wherein said optical filter has a pseudo-parabolic insertion loss function.

12. The optical device of claim 10, wherein the single parameter is varied as a function of temperature such that said optical filter compensates for variations in the gain spectrum of said optical amplifier that occur as a function of operating temperature.

13. The optical device of claim 10, wherein said optical filter has an average power loss that remains substantially constant throughout its tunable range.

14. The optical device of claim 10, wherein said optical device is a monolithic device.

15. The optical device of claim 10, wherein said optical filter is at least partially implemented using a multi-clad waveguide.

16. The optical device of claim 10, wherein said optical filter is at least partially implemented in a planar waveguide.

17. The optical device of claim 10, wherein the center wavelength of said optical filter is adjusted as a function of the input spectral signal content to said optical amplifier.

18. The optical device of claim 17, wherein said optical filter changes the gain slope or shape of said optical amplifier in response to a change in the input spectral signal content that occurs as a result of variations of loss in an optical fiber span of an optical system in which the optical amplifier is utilized.

19. The optical device of claim 17, wherein said optical amplifier is used in an optical system, and wherein said optical filter changes the gain slope or shape of said amplifier in response to a change in the spectral signal content of the optical system that occurs as a result of variations of Raman gain in an optical fiber span of the optical system.

20. The optical device of claim 19, wherein the Raman gain varies as a result of changes in span length, or optical fiber composition, or as a result of an upgrade to the optical system through additionally populating the optical input signal to the optical amplifier with more or less channels of significantly increased or decreased spectral extent or spectral power density.

21. The optical device of claim 17, wherein said optical amplifier is an Erbium doped amplifier of an optical system, and wherein said optical filter changes the gain slope or shape of the Erbium doped amplifier in response to a change in the spectral signal content of the optical system that occurs as a result of variations of Erbium doped amplifier gain in the Erbium doped amplifier of the optical system.

22. The optical device of claim 21, wherein the Erbium doped amplifier gain varies as a result of optical amplifier fiber length, or optical amplifier fiber composition, or as a result of an upgrade to the optical system through additionally populating the optical input signal to the Erbium doped amplifier with more or less channels of significantly increased or decreased spectral extent or spectral power density.

23. A method of adjusting the gain slope of an optical device that operates within an operating waveband, said method comprising the steps of:
(a) coupling a tunable optical filter to the optical device, the optical filter having a spectral filter function that is substantially non-linear throughout the operating waveband of the optical device and defines a central wavelength falling within the operating waveband; and
(b) adjusting the central wavelength of the optical filter until a desired gain slope adjustment results.

24. The method of claim 23, wherein the optical filter has a pseudo-parabolic insertion loss function.

25. The method of claim 23, wherein the central wavelength is adjusted as a function of temperature such that the optical filter compensates for variations in the gain spectrum of the optical device that occur as a function of operating temperature.

26. The method of claim 23, wherein the optical filter has a spectral filter function that is substantially symmetric about the central wavelength.

27. The method of claim 26, wherein the optical filter has an average power loss that remains substantially constant throughout its tunable range.

28. The method of claim 23, wherein the optical device includes an optical amplifier having at least one amplifying stage.

29. The method of claim 28, wherein the center wavelength of the optical filter is adjusted as a function of the input spectral signal content.

30. The method of claim 29, wherein said optical filter changes the gain slope or shape of the optical amplifier in response to a change in the input spectral signal content that occurs as a result of variations of loss in an optical fiber span of an optical system in which the optical amplifier is utilized.

31. The method of claim 29, wherein the optical amplifier is used in an optical system, and wherein the optical filter changes the gain slope or shape of the Raman amplifier in response to a change in the spectral signal content of the optical system that occur as a result of variations of Raman gain in an optical fiber span of the optical system.

32. The method of claim 31, wherein the Raman gain varies as a result of changes in span length, or optical fiber composition, or as a result of an upgrade to the optical system through additionally populating the optical input signal to the optical amplifier with more or less channels of significantly increased or decreased spectral extent or spectral power density.

33. The method of claim 29, wherein the optical amplifier is an Erbium doped amplifier of an optical system, and wherein the optical filter changes the gain slope or shape of the Erbium doped amplifier in response to a change in the spectral signal content of the optical system that occurs as a result of variations of Erbium doped amplifier gain in the Erbium doped amplifier of the optical system.

34. The method of claim 33, wherein the Erbium doped amplifier gain varies as a result of optical amplifier fiber length, or optical amplifier fiber composition, or as a result of an upgrade to the optical system through additionally populating the optical input signal to the Erbium doped amplifier with more or less channels of significantly increased or decreased spectral extent or spectral power density.

35. An optical device having an optical input and output, said optical device comprising:
an optical amplifier to optical signals received through the optical input of the device, said optical amplifier exhibiting a gain that varies approximately linearly with respect to wavelength in accordance with a gain slope; and
a tunable optical filter coupled to said optical amplifier, wherein said optical filter has a spectral filter function that is substantially symmetric about a central wavelength, and said optical filter changes the gain slope of the optical amplifier in response to a change in the central wavelength,
wherein said optical filter is a Mach-Zehnder interferometer and the single parameter that is changed is a relative phase accumulation between two arms of said Mach-Zehnder interferometer.

36. A method of adjusting the gain slope of an optical device, said method comprising the steps of:
(a) coupling a tunable optical filter to the optical device, the optical filter having a spectral filter function that is substantially non-linear throughout the operating waveband of the optical device and defines a central wavelength; and
(b) adjusting the central wavelength of the optical filter until a desired gain slope adjustment results,
wherein the optical filter is a Mach-Zehnder interferometer and the central wavelength that is adjusted in step (b) is a relative phase accumulation between two arms of said Mach-Zehnder interferometer.

37. An optical filter for an optical device that exhibits at least two different gain states and that operates within an operating waveband, said optical filter comprising a tunable filter component that changes its spectral filter function at least two different states corresponding to the at least two different gain states of the optical device in response to a change in a single parameter of said optical filter, wherein the spectral filter function of said tunable filter component is substantially non-linear throughout the operating waveband of the optical device and defines a central wavelength falling within the operating waveband, and wherein said single parameter is the central wavelength.

38. The optical filter of claim 37, wherein said tunable filter changes the gain slope of the optical device in response to a change in the central wavelength of said tunable filter component.

39. The optical filter of claim 37, wherein the central wavelength of the optical filter may be shifted until a desired gain slope adjustment results.

* * * * *